(12) United States Patent
Pawar et al.

(10) Patent No.: US 8,189,465 B1
(45) Date of Patent: May 29, 2012

(54) DEEP PACKET INSPECTION POLICY ENFORCEMENT

(75) Inventors: Hemanth Balaji Pawar, Herndon, VA (US); Shilpa Kowdley Srinivas, Herndon, VA (US); Badri Prasad Subramanyan, Overland Park, KS (US); Piyush Upadhyay, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 164 days.

(21) Appl. No.: 12/365,187

(22) Filed: Feb. 4, 2009

(51) Int. Cl.
*G06F 11/00* (2006.01)

(52) U.S. Cl. ......... 370/230; 370/236; 370/235; 370/232

(58) Field of Classification Search .......... 370/229–240, 370/310–350
See application file for complete search history.

(56) References Cited

U.S. PATENT DOCUMENTS

| | | | |
|---|---|---|---|
| 2002/0004379 A1* | 1/2002 | Gruhl et al. | 455/403 |
| 2002/0128017 A1 | 9/2002 | Virtanen | |
| 2003/0174647 A1* | 9/2003 | Gutierrez et al. | 370/230 |
| 2003/0227882 A1* | 12/2003 | Czaja et al. | 370/329 |
| 2004/0106431 A1 | 6/2004 | Laroia et al. | |
| 2005/0009515 A1* | 1/2005 | Inoko | 455/426.2 |
| 2007/0091817 A1* | 4/2007 | Yoon et al. | 370/252 |
| 2007/0153687 A1* | 7/2007 | Attar et al. | 370/229 |
| 2009/0274095 A1* | 11/2009 | Iwasa et al. | 370/328 |
| 2010/0105401 A1* | 4/2010 | Chun et al. | 455/450 |

* cited by examiner

*Primary Examiner* — Kwang B Yao
*Assistant Examiner* — Kenan Cehic (57) ABSTRACT

A data packet is selected from a flow of data traffic communicated between a wireless device and a network. An attribute of the data packet is inspected to associate the packet with a profile. Based on the profile, a network policy associated with the wireless device is determined. The network policy may be enforced by causing a message to be sent to the wireless device instructing the wireless device to enter a dormant mode. The network policy may be enforced by causing a message to be sent to the wireless device that causes the wireless device to not request air-interface resources from a sector.

20 Claims, 7 Drawing Sheets

```
┌─────────────────────────────────┐
│  SELECT A PACKET FROM A FLOW OF │
│  TRAFFIC COMMUNICATED BETWEEN A │
│   WIRELESS DEVICE AND A NETWORK │
│                502              │
└─────────────────────────────────┘
                 │
┌─────────────────────────────────┐
│  INSPECT AN ATTRIBUTE OF THE    │
│  PACKET TO ASSOCIATE THE PACKET │
│         WITH A PROFILE          │
│                504              │
└─────────────────────────────────┘
                 │
┌─────────────────────────────────┐
│   BASED ON THE PROFILE,         │
│   DETERMINE A NETWORK POLICY    │
│   ASSOCIATED WITH THE           │
│         WIRELESS DEVICE         │
│                506              │
└─────────────────────────────────┘
                 │
┌─────────────────────────────────┐
│  ENFORCE THE NETWORK POLICY BY  │
│  CAUSING A MESSAGE TO BE SENT   │
│  TO THE WIRELESS DEVICE THAT    │
│  CAUSES THE WIRELESS DEVICE TO  │
│  NOT REQUEST AIR-INTERFACE      │
│    RESOURCES FROM A SECTOR      │
│                508              │
└─────────────────────────────────┘
```

DEEP PACKET INSPECTION POLICY ENFORCEMENT

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

Overview

A method of operating a communication system is disclosed. A data packet is selected from a flow of data traffic communicated between a wireless device and a network. An attribute of the data packet is inspected to associate the packet with a profile. Based on the profile, a network policy associated with the wireless device is determined. The network policy is enforced by causing a message to be sent to the wireless device instructing the wireless device to enter a dormant mode.

A data packet is selected from a flow of data traffic communicated between a wireless device and a network. An attribute of the data packet is inspected to associate the packet with a profile. Based on the profile, a network policy associated with the wireless device is determined. The network policy is enforced by causing a message to be sent to the wireless device that causes the wireless device to not request air-interface resources from a sector.

A data packet is selected from a flow of data traffic communicated between a wireless device and a network. An attribute of the data packet is inspected to associate the packet with a profile. Based on the profile, a network policy associated with the wireless device is determined. The network policy is enforced by causing a message to be sent to the wireless device that causes the wireless device to not request air-interfaces from a sector. The network policy is enforced by causing a message to be sent to the wireless device instructing the wireless device to enter a dormant mode.

DETAILED DESCRIPTION

In an embodiment, one or more packets are selected from a traffic flow communicated between a wireless device and a network. These packets are inspected using data packet inspection (DPI) techniques to determine whether to enforce a network policy on the traffic flow or wireless device. If the network policy should be enforced, a message is caused to be sent to the wireless device. In an embodiment, this message enforces the network policy by switching the wireless device into a dormant mode. In an embodiment, this message enforces the network policy by telling the wireless device that it should not request air-interface resources from a sector.

Figure 1:
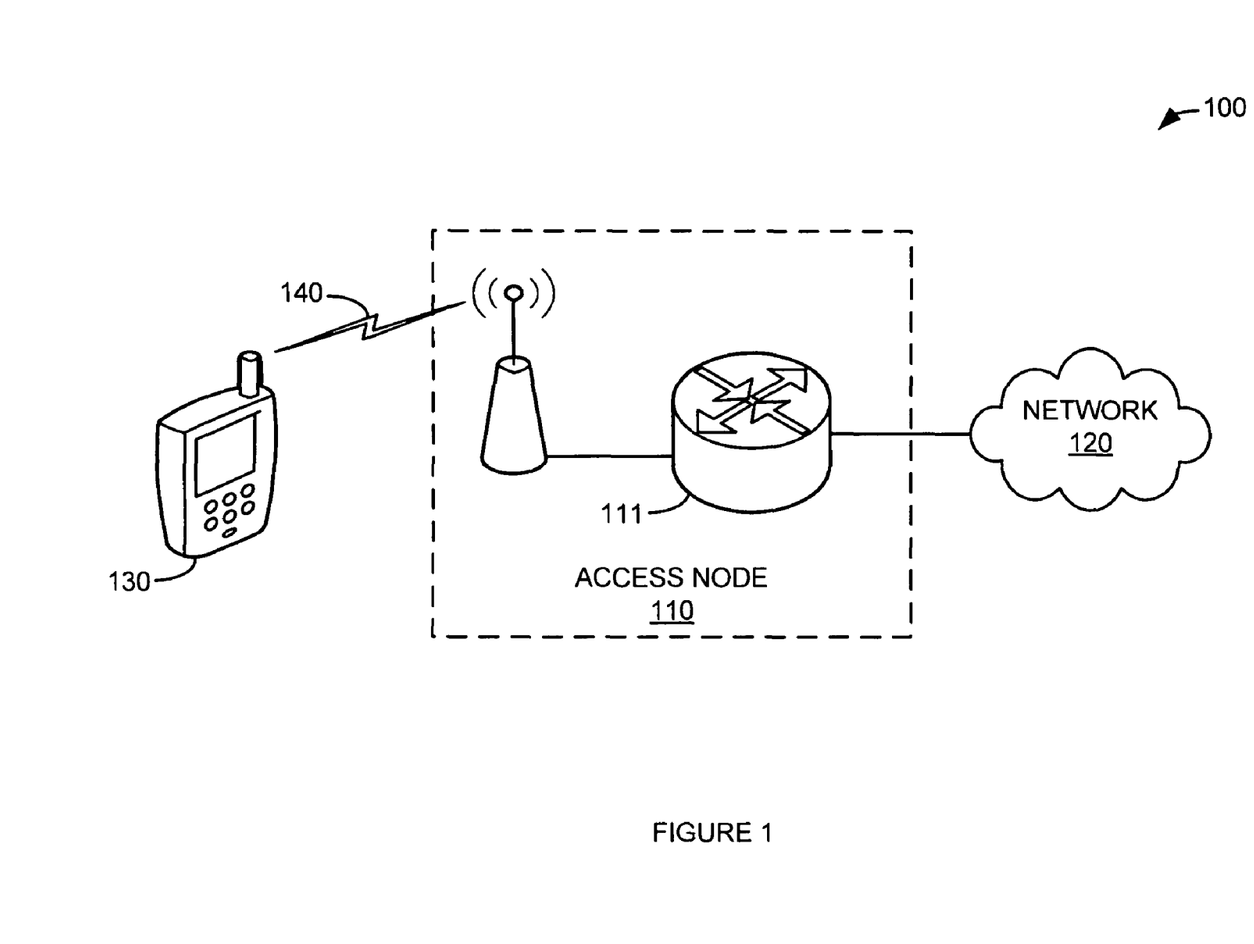
FIG. 1 is a block diagram illustrating a communication system.

FIG. 1 is a block diagram illustrating a communication system. In FIG. 1, communication system 100 comprises access node 110, network 120, and wireless device 130. Access node 110 includes inspection component 111. Wireless device 130 is operatively coupled to access node 110 via wireless link 140. Access node 110 is operatively coupled to network 120. Thus, wireless device 130 may be operatively coupled to network 120 via access node 110. The communications between wireless device 130 and network 120 may be relayed, monitored, and/or inspected by inspection component 111 of access node 110.

Wireless device 130 may be any device, system, combination of devices, or other such communication platform capable of communicating with access node 110 via wireless link 140. Wireless device 130 may use communication aspects specified by the EV-DO specifications. Wireless device 130 may be able to communicate with a code division multiple access (CDMA) network. Wireless device 130 may be, or comprise, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with access node 110 via wireless links. Other types of communication platforms are possible.

Access node 110 may be any wireless system that provides an air-interface to wireless device 130. Access node 110 may use one or more transmitters. Access node 110 may use one or more receivers. Access node 110 may be any wireless system that can provide an air-interface to wireless device 130. Access node 110 may use communication aspects specified by the EV-DO specification. Examples of components in access node 110 that may be utilized include, base transceiver stations (BTSs), radio base stations (RBSs), radio network controllers (RNC), Node B, enhanced Node B (eNBs) and others. Base transceiver stations may include a number of elements known to those skilled in the art comprising transceivers, power amplifiers, combiner, duplexer, and antennas. BTSs may also include a control function or control computer. Access node 110 also includes inspection component 111. Inspection component 111 may be or comprise a computer or router such as a data packet inspection router.

Network 120 may be any network or collection of networks that couple, link, or otherwise operatively connect access node 110 with other devices or systems. Network 120 may include other secondary data networks. In an example, network 120 may include a backhaul network, a local network, a long distance network, a packet network, the internet, or any combination thereof, as well as other types of networks.

In an embodiment, a flow of data traffic is communicated between wireless device 130 and network 120. Inspection component 111 may select a data packet from this flow. Inspection component 111 may select multiple packets over time from the flow. A data packet inspection process is then performed on the selected packet(s). The data packet inspection process may examine one or more attributes of the selected packet. For example, the data packet inspection process may examine one or more of: (1) a user indicator that is associated with a user of the wireless device; (2) an application indicator that is associated with an application that originated the data packet; (3) a device indicator that is associated with a wireless device that originated or is going to receive the data packet; and, (4) a sector indicator that is associated with a wireless network resource that will, or has, carried the data packet. Additional attributes may also be examined.

These attributes may be used to associate the packet with a profile. A profile may be associated with one or more network policies to be enforced. In an example, attributes may be used to associate the packet with a profile of an application that is subject to a network policy (e.g., bit torrent, live video, etc.). In another example, these attributes may be used to associate the packet with a profile associated with a network resource (e.g., access node, RAN, etc.). In another example, these attributes may be used to associate the packet with a profile associated with service level to be provided to wireless device 130.

A service level may be, for example, associated with a throughput rate cap that limits wireless device 130. In another example, a service level may be associated with a total amount of data (e.g., Gigabytes per month) that wireless device 130 is allowed to receive (or send) over a given time period. Service levels may also be associated with an application that is subject to a network policy. For example, the service level agreement associated with wireless device 130 may allow for a certain total amount of data. However, the service level agreement may also provide that no more than 10% of that data can be associated with a certain application, such as bit torrent.

A profile may also be used to prioritize. For example, a profile may be associated with giving a certain network resource (e.g., access node 110) priority over another network resource. Likewise, a profile may be associated with giving a wireless device or application priority over another wireless device or application.

In an embodiment, the network policy may be enforced by causing a message to be sent to wireless device 130 that instructs it to enter a dormant mode. For example, inspection component 111 may cause access node 110 to send a message to wireless device 130. This message may instruct wireless device 130 to enter a dormant mode. Wireless device 130 is said to be in a dormant state if there is no traffic connection but the session is still intact. In dormant mode, there is no transmission of data in either the forward or reverse link directions. In an example, a dormant mode is one of three modes (e.g., active, dormant, and idle) defined in the EV-DO specifications.

After sending a message that places wireless device 130 in a dormant mode, communication system 100 may start a timer. This timer may determine when wireless device 130 may exit the dormant mode. Before the expiration of the timer, communication system 100 may disallow wireless device 130 from exiting the dormant mode. For example, when wireless device 130 is in a dormant mode, it may try to exit the dormant mode by requesting air-interface resources from access node 110. Communication system 100 may ignore that request until the expiration of the timer. In another example, in response to the request for air-interface resources, and until the timer expires, communication system 100 may send additional messages instructing wireless device 130 to enter (or remain) in the dormant mode.

In an embodiment, communication system 100 may receive a request from wireless device 130 for air-interface resources. Inspection component 111 may inspect that request. If inspection component 111 determines that this request is associated with the same profile that caused the network policy to be enforced, communication system 100 may disallow wireless device 130 from exiting the dormant mode.

In an embodiment, the network policy may be enforced by causing a message to be sent to wireless device 130 that causes it to not request air-interface resources from a sector. For example, inspection component 111 may cause access node 110 to send a message to wireless device 130. This message may inform wireless device 130 that access node 110 is unavailable to provide air-interface resources to wireless device 130.

In an example, a message may comprise setting the data rate control lock (DRCLock) bit defined in the EV-DO specifications. When the DRCLock bit is set, it implies that access node 110 cannot reliably receive requests from wireless device 130. Thus, it implies that for a configurable period of time, access node 110 is unavailable to allocate air-interface resources to wireless device 130. This configurable period of time may be tracked by a timer in wireless device 130, access node 110, or both. In an embodiment, the network policy may be enforced by causing a plurality of messages to be sent to wireless device 130 from a plurality of sectors that cause wireless device 130 to not request air-interface resources from those sectors.

Note that typical enforcement of a network policy is accomplished by dropping packets. By either putting wireless device 130 into a dormant mode, by setting the DRCLock bit sent to wireless device 130, or both, the network policy is enforced by existing features in the EV-DO specifications. This enforces the network policy by denying wireless device 130 data service. Thus, the same result is achieved as dropping packets without having to actually drop packets.

Figure 2:
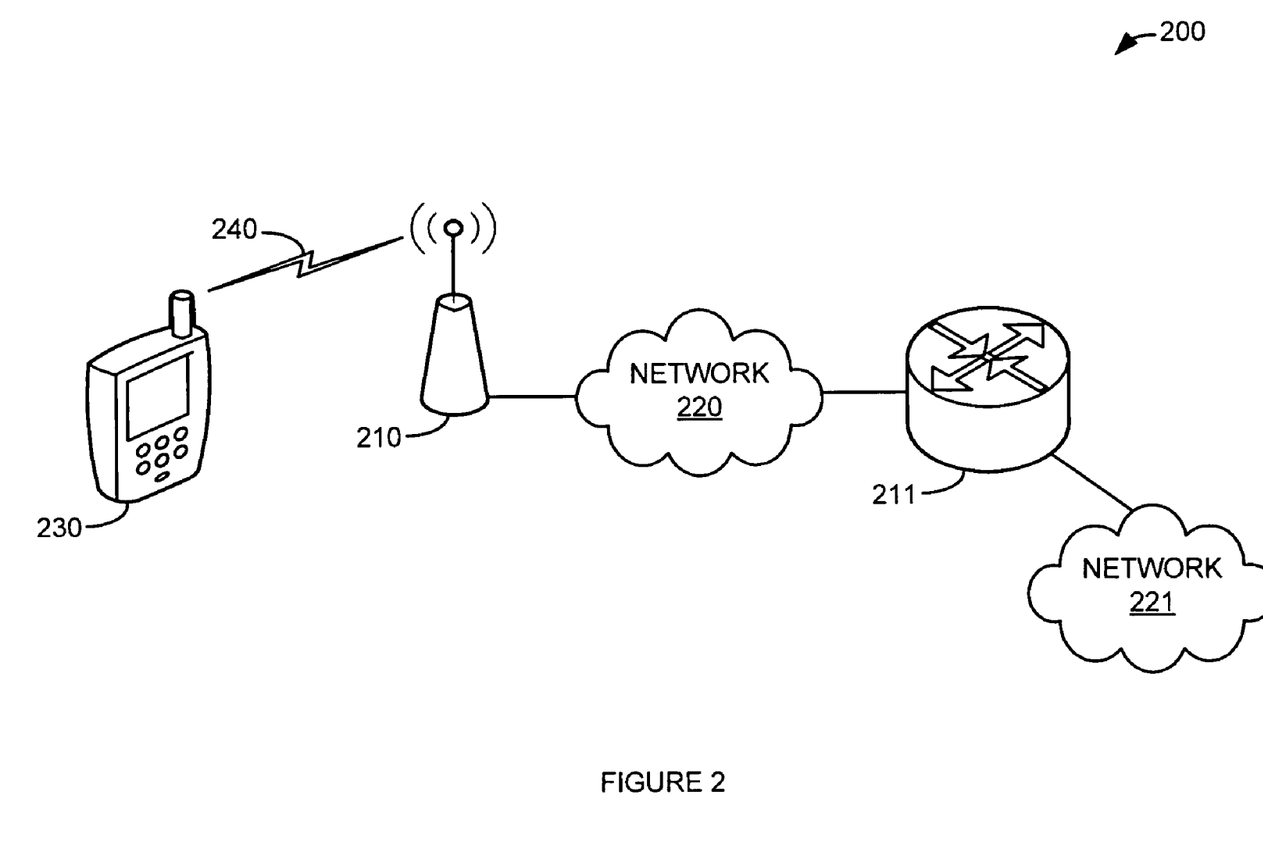
FIG. 2 is a block diagram illustrating a communication system.

FIG. 2 is a block diagram illustrating a communication system. In FIG. 2, communication system 200 comprises access node 210, inspection component 211, network 220, network 221, and wireless device 230. Wireless device 230 is operatively coupled to access node 210 via wireless link 240. Access node 210 is operatively coupled to network 220. Network 220 is operatively coupled to inspection component 211. Inspection component 211 is operatively coupled to network 221. Thus, wireless device 230 may be operatively coupled to network 221 via access node 210, network 220, and inspection component 211. Thus, the communication between wireless device 230 and network 221 may be relayed, monitored, and/or inspected by inspection component 211.

Wireless device 230 may be any device, system, combination of devices, or other such communication platform capable of communicating with access node 210 via wireless link 240. Wireless device 230 may use communication aspects specified by the EV-DO specifications. Wireless device 230 may be able to communicate with a CDMA network. Wireless device 230 may be, or comprise, for example, a mobile phone, a wireless phone, a wireless modem, a PDA, a VoIP phone, a VOP phone, or a soft phone, as well as other types of devices or systems that can exchange data with access node 210 via wireless link 240. Other types of communication platforms are possible.

Access node 210 may be any wireless system that provides an air-interface to wireless device 230. Access node 210 may use one or more transmitters. Access node 210 may use one or more receivers. Access node 210 may be any wireless system that can provide an air-interface to wireless device 230. Access node 210 may use communication aspects specified by the EV-DO specifications. Examples of components in access node 210 that may be utilized include, BTSs, RBSs, radio network controllers RNCs, Node B, eNBs and others. Base transceiver stations may include a number of elements known to those skilled in the art comprising transceivers, power amplifiers, combiner, duplexer, and antennas. BTSs may include a control function or control computer.

Network 220 may be any network or collection of networks that couple, link, or otherwise operatively connect access node 210 with inspection component 211. Network 220 may include other secondary data networks. In an example, network 220 may include a backhaul network, a local network, a long distance network, a packet network, the internet, or any combination thereof, as well as other types of networks.

Network 221 may be any network or collection of networks that couple, link, or otherwise operatively connect inspection component 211 with other devices or systems. Network 221 may include other secondary data networks. In an example, network 221 may include a backhaul network, a local network, a long distance network, a packet network, the internet, or any combination thereof, as well as other types of networks.

In an embodiment, a flow of data traffic is communicated between wireless device 230 and network 221. Inspection component 211 may select a data packet from this flow. Inspection component 211 may select multiple packets over time from the flow. A data packet inspection process is performed on the selected packet(s). The data packet inspection process may examine one or more attributes of the selected packet. For example, the data packet inspection process may examine one or more of: (1) a user indicator that is associated with a user of the wireless device; (2) an application indicator that is associated with an application that originated the data packet; (3) a device indicator that is associated with a wireless device that originated or is going to receive the data packet; and, (4) a sector indicator that is associated with a wireless network resource that will, or has, carried the data packet. Additional attributes may also be examined.

These attributes may be used to associate the packet with a profile. A profile may be associated with one or more network policies to be enforced. In an example, attributes may be used to associate the packet with a profile of an application that is subject to a network policy (e.g., bit torrent, live video, etc.). In another example, these attributes may be used to associate the packet with a profile associated with a network resource (e.g., access node, RAN, etc.). In another example, these attributes may be used to associate the packet with a profile associated with a service level to be provided to wireless device 230.

A service level may be, for example, associated with a throughput rate cap that limits wireless device 230. In another example, a service level may be associated with a total amount of data (e.g., Gigabytes per month) that wireless device 230 is allowed to receive (or send) over a given time period. Service levels may also be associated with an application that is subject to a network policy. For example, the service level agreement associated with wireless device 230 may allow for a certain total amount of data. However, the service level agreement may also provide that no more than 10% of that data can be associated with a certain application, such as bit torrent.

A profile may also be used to prioritize. For example, a profile may be associated with giving a certain network resource (e.g., access node 210) priority over another network resource Likewise, a profile may be associated with giving a wireless device or application priority over another wireless device or application.

In an embodiment, the network policy may be enforced by causing a message to be sent to wireless device 230 that instructs wireless device 230 to enter a dormant mode. For example, inspection component 211 may cause access node 210 to send a message to wireless device 230. This message may instruct wireless device 230 to enter a dormant mode. Wireless device 230 is said to be in a dormant state if there is no traffic connection but the session is still intact. In dormant mode, there is no transmission of data in either the forward or reverse link directions. In an example, a dormant mode is one of three modes (e.g., active, dormant, and idle) defined in the EV-DO specifications.

After sending a message that places wireless device 230 in a dormant mode, communication system 200 may start a timer. This timer may determine when wireless device 230 may exit dormant mode. Before the expiration of the timer, communication system 200 may disallow wireless device 230 from exiting the dormant mode. For example, when wireless device 230 is in dormant mode, wireless device 230 may try to exit the dormant mode by requesting air-interface resources from access node 210. Communication system 200 may ignore that request until the expiration of the timer. In another example, in response to the request for air-interface resources, and until the timer expires, communication system 200 may send additional messages instructing wireless device 230 to enter (or remain) in the dormant mode.

In an embodiment, communication system 200 may receive a request from wireless device 230 for air-interface resources. Inspection component 211 may inspect that request. If inspection component 211 determines that this request is associated with a profile that caused a network policy to be enforced, communication system 200 may disallow wireless device 230 from exiting the dormant mode.

In an embodiment, the network policy may be enforced by causing a message to be sent to wireless device 230 that causes wireless device 230 to not request air-interface resources from a sector. For example, inspection component 211 may cause access node 210 to send a message to wireless device 230. This message may inform wireless device 230 that access node 210 is unavailable to provide air-interface resources to wireless device 230.

In an example, this message may comprise setting the DRCLock bit defined in the EV-DO specifications. When the DRCLock bit is set, it implies that access node 210 cannot reliably receive requests from wireless device 230. Thus, it implies that for a configurable period of time, access node 210 is unavailable to allocate air-interface resources to wireless device 230. This configurable period of time may be tracked by a timer in wireless device 230, access node 210, or both. In an embodiment, the network policy may be enforced by causing a plurality of messages to be sent to wireless device 230 from a plurality of sectors that cause it to not request air-interface resources from those sectors.

Note that typical enforcement of a network policy is accomplished by dropping packets. By either putting wireless device 230 into a dormant mode, by setting the DRCLock bit sent to wireless device 230, or both, the network policy is enforced by existing features in the EV-DO specifications. This enforces the network policy by denying wireless device 230 data service. Thus, the same result is achieved as a dropping packets without dropping packets.

Figure 3:
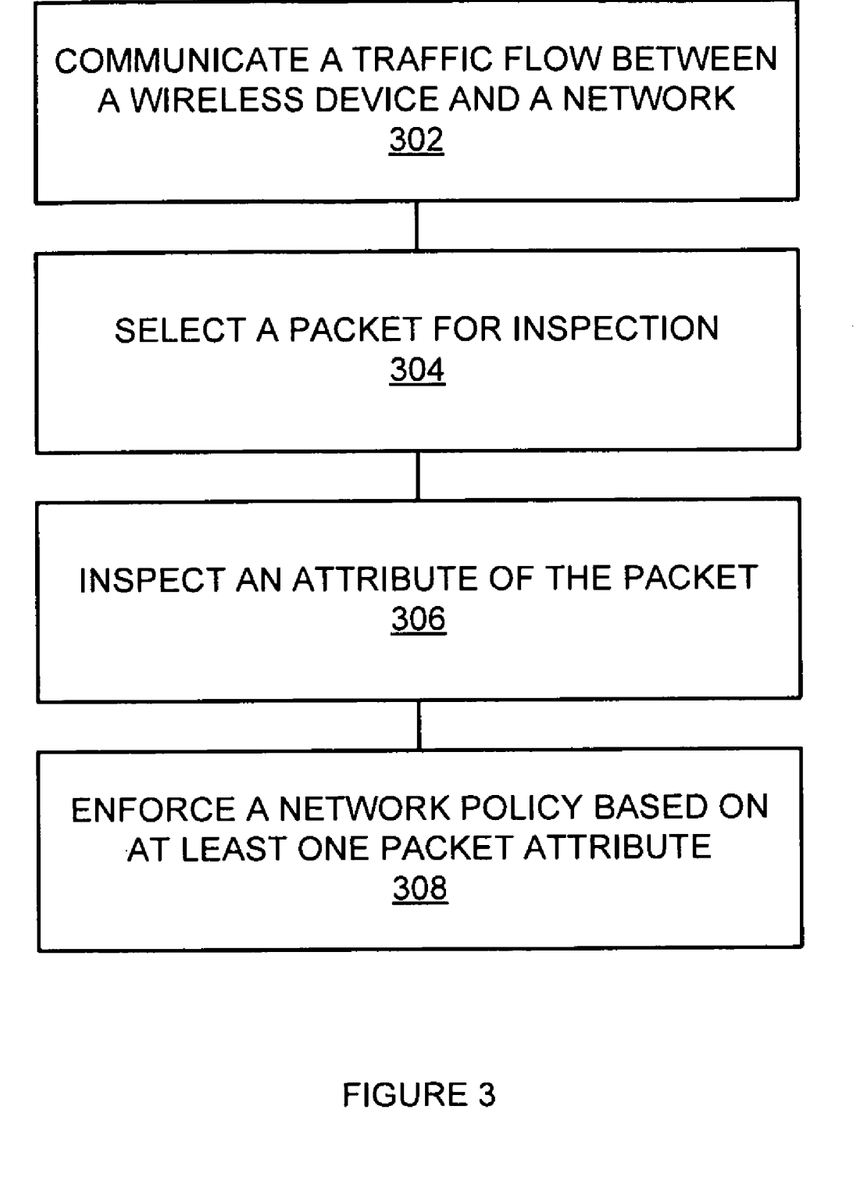
FIG. 3 is a flowchart illustrating a method of operating a communication system.

FIG. 3 is a flowchart illustrating a method of operating a communication system. The steps illustrated in FIG. 3 may be performed by one or more elements of communication system 100 or communication system 200.

A traffic flow is communicated between a wireless device and a network (302). For example, a flow of data packets may be communicated between wireless device 130 and network 120 via access node 110. A packet is selected for inspection (304). For example, inspection component 111 may select, for inspection, a packet from the flow between wireless device 130 and network 120.

An attribute of the packet is inspected (306). For example, the selected packet may be inspected for one or more of: (1) a user identifier attribute that indicates a user associated with a wireless device; (2) an application identifier attribute that indicates an application associated with the data packet; (3) a device identifier attribute that indicates a wireless device associated with the packet; and, (4) a sector identifier that indicates the wireless coverage area or a network resource associated with the packet.

A network policy is enforced based on at least one packet attribute (308). For example, there may be a criteria designated by communication system 100 for a value of a packet attribute. If the packet attribute meets the criteria, then the network policy is enforced Likewise, if the packet attribute does not meet the criteria, the network policy is not enforced. In addition, a criteria that involves multiple packets may be designated by communication system 100. For example, if a certain number of selected packets have a designated packet attribute over a pre-set period of time, then the network policy is enforced.

The network policy may be based on a profile. The profile or network policy may be based on a network resource, such as a sector. The profile or network policy may be based on an application associated with a packet or group of packets. The profile or network policy may be based on a wireless device or subscriber associated with the packet or group of packets. The profile or network policy may be based on a combination of network resource, application, wireless device, and/or subscriber.

For instance, a profile may be associated with a wireless device. This profile may determine the maximum throughput that the wireless device is allowed. Thus, a network policy that rate caps the flow of data to that wireless device may be enforced. In another example, a profile may be associated with a bit torrent application. Other applications may be designated to have a higher priority than bit torrent. Thus, a network policy that ensures the bit torrent application gets the lowest priority may be enforced by communication system 100.

A network policy may be enforced by causing a message to be sent to a wireless device that instructs it to enter a dormant mode. For example, inspection component 111 may cause access node 110 to send a message to wireless device 130. This message may instruct wireless device 130 to enter a dormant mode. In dormant mode, there is no transmission of data in either the forward or reverse link directions. In an example, a dormant mode is one of three modes (e.g., active, dormant, and idle) defined in EV-DO specifications.

A network policy may be enforced by causing a message to be sent to a wireless device that causes it to not request air-interface resources from a sector. For example, inspection component 111 may cause access node 110 to send a message to wireless device 130. This message may inform wireless device 130 that access node 110 is unavailable to provide air-interface resources to wireless device 130.

Figure 4:
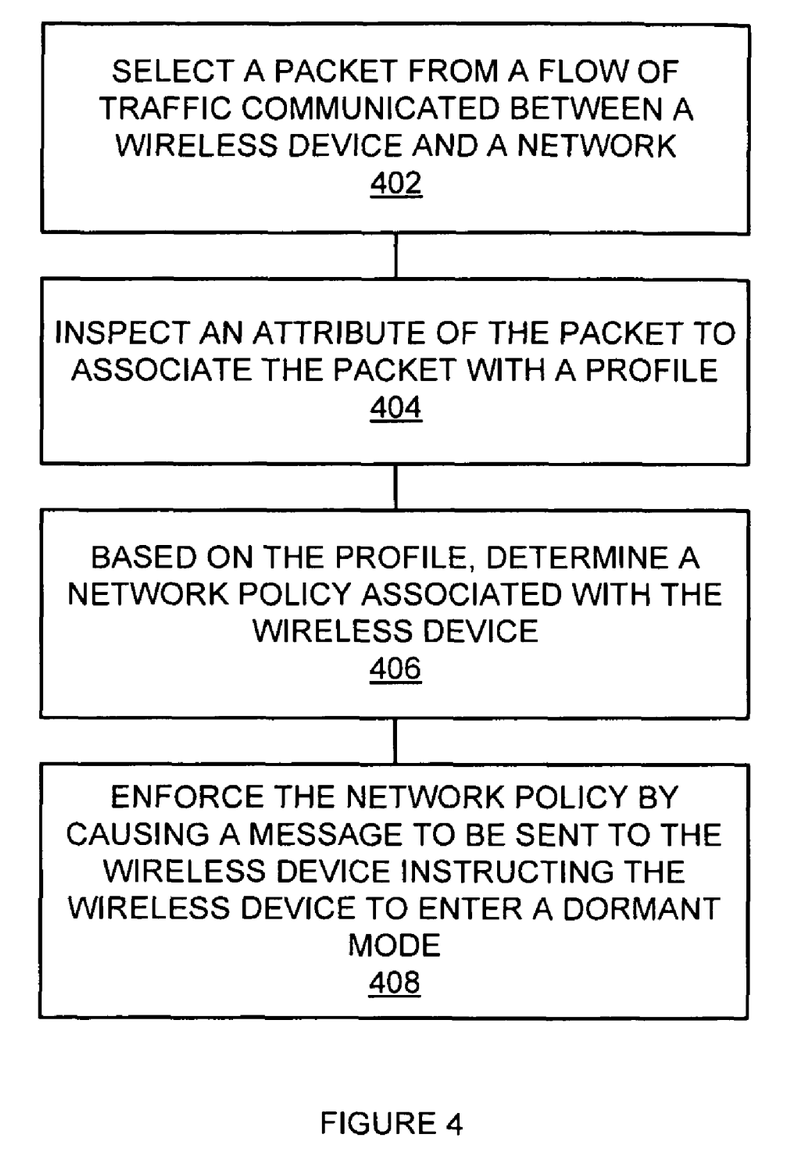
FIG. 4 is a flowchart illustrating a method of enforcing a network policy.

FIG. 4 is a flowchart illustrating a method of operating a communication system. The steps illustrated in FIG. 4 may be performed by one or more elements of communication system 100 or communication system 200.

A packet is selected from a flow of traffic communicated between a wireless device and a network (402). For example, a packet may be selected from a flow of traffic communicated between wireless device 230 and network 221. An attribute of the packet is inspected to associate the packet with a profile (404). For example, inspection component 211 may examine the selected packet to associate the packet with a profile. Inspection component 211 may examine a plurality of group of packets to associate them with a profile.

The selected packet or packets may be inspected for one or more of: (1) a user identifier attribute that indicates a user associated with a wireless device; (2) an application identifier attribute that indicates an application associated with the data packet; (3) a device identifier attribute that indicates a wireless device associated with the packet; and, (4) a sector identifier that indicates the wireless coverage area or a network resource associated with the packet. One or more of these attributes may be used to associate the packet with a profile.

The profile may be based on a network resource, such as a sector. The profile may be based on an application associated with a packet or group of packets. The profile may be based on the wireless device or subscriber associated with a packet or group of packets. The profile may be based on a combination of network resource, application, wireless device, and/or subscriber.

Based on the profile, a network policy associated with the wireless device is determined (406). For example, a profile may be associated with the maximum throughput that wireless device 230 is allowed. Thus, a network policy that limits the maximum throughput associated with wireless device 230 may be determined. In another example, a profile may be associated with a bit torrent application that is sending data to or from wireless device 230. Other applications may be designated to have a higher priority than bit torrent. Thus, a network policy that gives the bit torrent application associated with wireless device 230 a low priority may be determined.

The network policy is enforced by causing a message to be sent to the wireless device instructing the wireless device to enter a dormant mode (408). For example, inspection component 211 may cause access node 210 to send a message to wireless device 230. This message may instruct wireless device 230 to enter a dormant mode. In dormant mode, there is no transmission of data in either the forward or reverse link directions. In an example, the dormant mode is the dormant mode defined in the EV-DO specifications.

Figure 5:
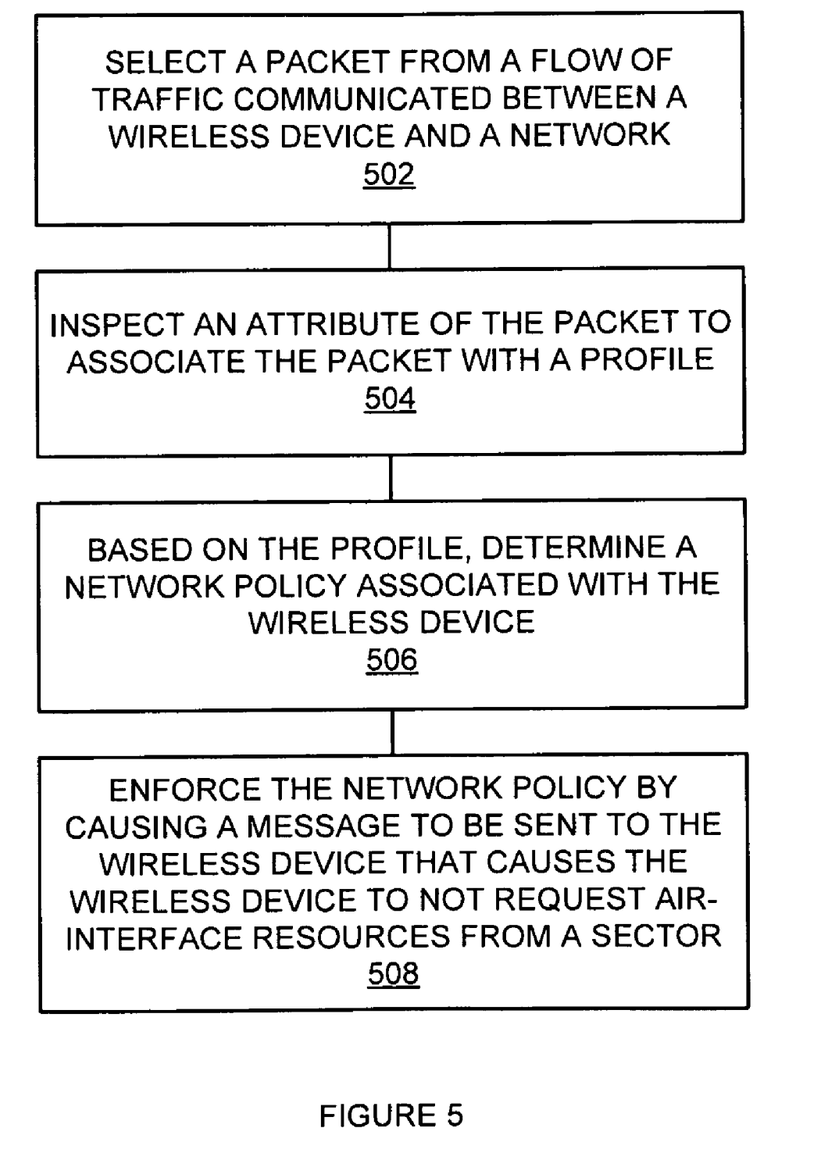
FIG. 5 is a flowchart illustrating a method of enforcing a network policy.

FIG. 5 is a flowchart illustrating a method of operating a communication system. The steps illustrated in FIG. 5 may be performed by one or more elements of communication system 100 or communication system 200.

A packet is selected from a flow of traffic communicated between a wireless device and a network (502). For example, a packet may be selected from a flow of traffic communicated between wireless device 130 and network 120. An attribute of the packet is inspected to associate the packet with a profile (504). For example, inspection component 111 may examine the selected packet to associate the packet with a profile. Inspection component 111 may examine a plurality or group of packets to associated them with a profile.

For instance, the selected packet may be inspected for one or more of: (1) a user identifier attribute that indicates a user associated with a wireless device; (2) an application identifier attribute that indicates an application associated with the data packet; (3) a device identifier attribute that indicates a wireless device associated with the packet; and, (4) a sector identifier that indicates the wireless coverage area or a network resource associated with the packet. One or more of these attributes may be used to associate the packet with a profile.

The profile may be based on a network resource, such as a sector. The profile may be based on an application associated with a packet or group of packets. The profile may be based on the wireless device or subscriber associated with a packet or group of packets. The profile may be based on a combination of network resource, application, wireless device, and/or subscriber.

Based on the profile, a network policy associated with the wireless device is determined (506). For example, a profile may be associated with the maximum throughput that the wireless device 130 is allowed. Thus, a network policy that limits the maximum throughput associated with wireless device 130 may be determined. In another example, a profile may be associated with a bit torrent application that is sending data to or from wireless device 130. Other applications may be designated to have a higher priority than bit torrent. Thus, a network policy that gives the bit torrent application associated with wireless device 130 a low priority may be determined.

The network policy is enforced by causing a message to be sent to the wireless device that causes the wireless device to not request air-interface resources from a sector (508). For example, inspection component 111 may cause access node 110 to send a message to wireless device 130. This message may inform wireless device 130 that access node 110 is unavailable to provide air-interface resources to wireless device 130.

For example, the message may comprise setting the DRCLock bit defined in the EV-DO specifications. When the DRCLock bit is set, it implies that access node 110 cannot reliably receive requests from wireless device 130. Thus, it implies that for a configurable period of time, access node 110 is unavailable to allocate air-interface resources to wireless device 130. This configurable period of time may be tracked by a timer in wireless device 130, access node 110, or both. In an embodiment, the network policy may be enforced by causing a plurality of messages to be sent to wireless device 130 from a plurality of sectors that cause it to not request air-interface resources from those sectors.

Figure 6:
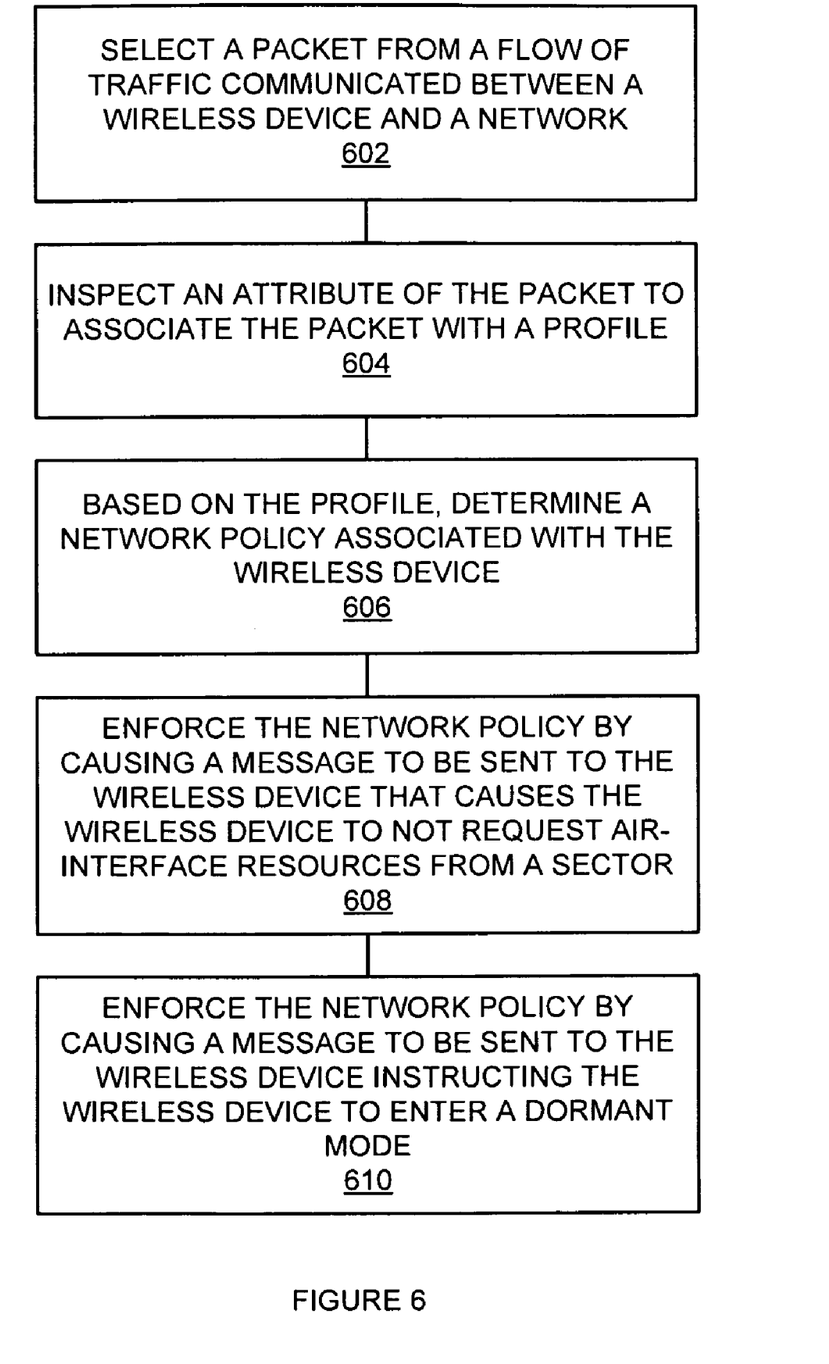
FIG. 6 is a flowchart illustrating a method of enforcing a network policy based on the inspection of packets.

FIG. 6 is a flowchart illustrating a method of operating a communication system. The steps illustrated in FIG. 6 may be performed by one or more elements of communication system 100 or communication system 200.

A packet is selected from a flow of traffic communicated between a wireless device and a network (602). For example, a packet may be selected from a flow of traffic communicated between wireless device 230 and network 221. An attribute of the packet is inspected to associate the packet with a profile (604). For example, inspection component 211 may examine the selected packet to associate the packet with a profile. Inspection component 211 may examine a plurality or group of packets to associated them with a profile.

For instance, the selected packet may be inspected for one or more of: (1) a user identifier attribute that indicates a user associated with a wireless device; (2) an application identifier attribute that indicates an application associated with the data packet; (3) a device identifier attribute that indicates a wireless device associated with the packet; and, (4) a sector identifier that indicates the wireless coverage area or a network resource associated with the packet. One or more of these attributes may be used to associate the packet with a profile.

The profile may be based on a network resource, such as a sector. The profile may be based on an application associated with a packet or group of packets. The profile may be based on the wireless device or subscriber associated with a packet or group of packets. The profile may be based on a combination of network resource, application, wireless device, and/or subscriber.

Based on the profile, a network policy associated with the wireless device is determined (606). For example, a profile may be associated with the maximum throughput that the wireless device 230 is allowed. Thus, a network policy that limits the maximum throughput associated with wireless device 230 may be determined. In another example, a profile may be associated with a bit torrent application that is sending data to or from wireless device 230. Other applications may be designated to have a higher priority than bit torrent. Thus, a network policy that gives the bit torrent application associated with wireless device 230 a low priority may be determined.

The network policy is enforced by causing a message to be sent to the wireless device that causes the wireless device to not request air-interface resources from a sector (608). For example, inspection component 211 may cause access node 210 to send a message to wireless device 230. This message may inform wireless device 230 that access node 210 is unavailable to provide air-interface resources to wireless device 130.

The message may comprise setting the DRCLock bit defined in the EV-DO specifications. When the DRCLock bit is set, it implies that access node 210 cannot reliably receive requests from wireless device 230. Thus, it implies that for a configurable period of time, access node 210 is unavailable to allocate air-interface resources to wireless device 230. This configurable period of time may be tracked by a timer in wireless device 230, access node 210, or both. In an embodiment, the network policy may be enforced by causing a plurality of messages to be sent to wireless device 230 from a plurality of sectors that cause it to not request air-interface resources from those sectors.

The network policy is enforced by causing a message to be sent to the wireless device instructing the wireless device to enter a dormant mode (610). For example, inspection component 211 may cause access node 210 to send a message to wireless device 230. This message may instruct wireless device 230 to enter a dormant mode. In dormant mode, there is no transmission of data in either the forward or reverse link directions. In an example, a dormant mode is the dormant mode defined in EV-DO specifications.

The methods, systems, components, networks, and devices described above may be implemented with or executed by one or more computer systems. The methods described above may also be stored on a computer readable medium. Many of the elements of communication system 100 and communication system 200 may be, comprise, or include computers systems. This includes, but is not limited to access node 110, network 120, wireless device 130, inspection component 111, access node 210, inspection component 211, network 220, network 221, and wireless device 230.

Figure 7:
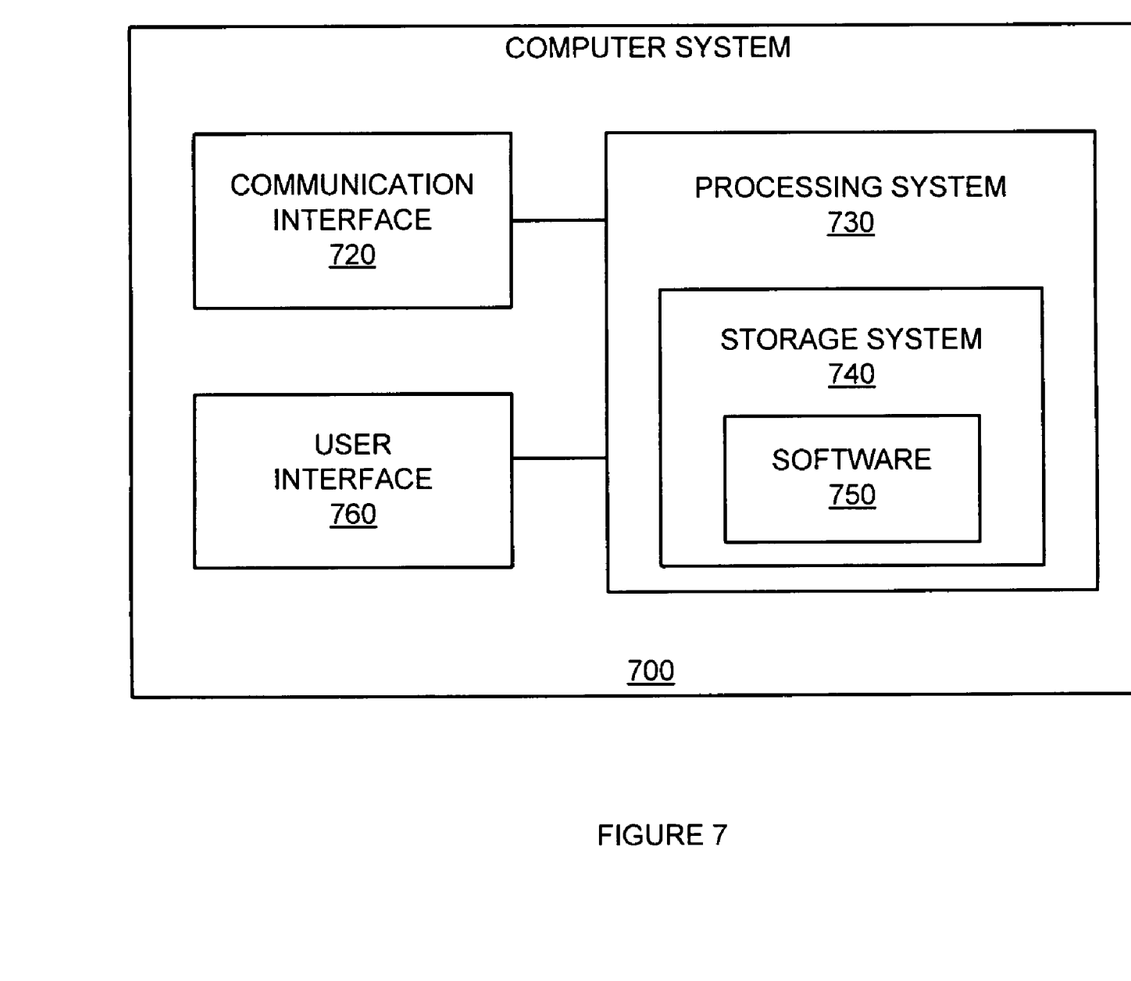
FIG. 7 is a block diagram of a computer system.

FIG. 7 illustrates a block diagram of a computer system. Computer system 700 includes communication interface 720, processing system 730, and user interface 760. Processing system 730 includes storage system 740. Storage system 740 stores software 750. Processing system 730 is linked to communication interface 720 and user interface 760. Computer system 700 could be comprised of a programmed general-purpose computer, although those skilled in the art will appreciate that programmable or special purpose circuitry and equipment may be used. Computer system 700 may be distributed among multiple devices that together comprise elements 720-760.

Communication interface 720 could comprise a network interface, modem, port, transceiver, or some other communication device. Communication interface 720 may be distributed among multiple communication devices. Processing system 730 could comprise a computer microprocessor, logic circuit, or some other processing device. Processing system 730 may be distributed among multiple processing devices. User interface 760 could comprise a keyboard, mouse, voice recognition interface, microphone and speakers, graphical display, touch screen, or some other type of user device. User interface 760 may be distributed among multiple user devices. Storage system 740 could comprise a disk, tape, integrated circuit, server, or some other memory device. Storage system 740 may be distributed among multiple memory devices.

Processing system 730 retrieves and executes software 750 from storage system 740. Software 750 may comprise an operating system, utilities, drivers, networking software, and other software typically loaded onto a computer system. Software 750 could comprise an application program, firmware, or some other form of machine-readable processing instructions. When executed by processing system 730, software 750 directs processing system 730 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
    selecting a data packet from a flow of data traffic communicated between a wireless device and a network;
    inspecting an attribute of the data packet, wherein the attribute includes an application indicator that is associated with an application on the wireless device;
    based on the attribute, associating the data packet with at least one of a plurality of service levels;
    based on the at least one service level, determining a network policy associated with the wireless device; and,
    enforcing the network policy by causing a message to be sent to the wireless device instructing the wireless device to enter a dormant mode if the network policy indicates that the application has a low priority relative to other applications.

2. The method of claim 1, further comprising:
    starting a timer that determines when the wireless device may exit the dormant mode.

3. The method of claim 2, further comprising:
    disallowing the wireless device from exiting the dormant mode based on the timer.

4. The method of claim 2, further comprising:
    disallowing the wireless device from exiting the dormant mode based on a second data packet being associated with the at least one service level by inspecting an attribute of the second data packet.

5. The method of claim 1, wherein the attribute further includes at least one of:
    (1) a user indicator that is associated with the wireless device;
    (2) a device indicator that is associated with the wireless device; and,
    (3) a sector indicator that is associated with a wireless network resource.

6. The method of claim 1, wherein the network policy comprises limiting a throughput rate associated with at least one of a wireless network resource, the wireless device, and the application on the wireless device.

7. The method of claim 1, wherein the network policy comprises limiting an amount of data over a time period associated with at least one of a wireless network resource, the wireless device, and the application on the wireless device.

8. The method of claim 1, wherein the network policy comprises prioritization of at least one of a wireless network resource, the wireless device, and the application on the wireless device.

9. A method of operating a communication system, comprising:
    selecting a data packet from a flow of data traffic communicated between a wireless device and a network;
    inspecting an attribute of the data packet, wherein the attribute includes an application indicator that is associated with an application on the wireless device;
    based on the attribute, associating the data packet with at least one of a plurality of service levels;
    based on the at least one service level, determining a network policy associated with the wireless device; and,
    enforcing the network policy by causing a message to be sent to the wireless device that causes the wireless device to not request air-interface resources from a sector if the network policy indicates that the application has a low priority relative to other applications.

10. The method of claim 9, further comprising:
    starting a timer that determines when the wireless device may request air-interfaces from the sector.

11. The method of claim 9, wherein the message comprises an indicator of a data rate control lock.

12. The method of claim 10, further comprising:
    based on the timer, sending a plurality of messages to the wireless device that causes the wireless device to not request air-interfaces from the sector.

13. The method of claim 9, wherein the attribute further includes at least one of:
    (1) a user indicator that is associated with the wireless device;
    (2) a device indicator that is associated with the wireless device; and,
    (3) a sector indicator that is associated with a wireless network resource.

14. The method of claim 9, wherein the network policy comprises limiting a throughput rate associated with at least one of a wireless network resource, the wireless device, and the application on the wireless device.

15. The method of claim 9, wherein the network policy comprises limiting an amount of data over a time period associated with at least one of a wireless network resource, the wireless device, and the application on the wireless device.

16. The method of claim 9, wherein the network policy comprises prioritization of at least one of a wireless network resource, the wireless device, and the application on the wireless device.

17. A method of operating a communication system, comprising:

selecting a data packet from a flow of data traffic communicated between a wireless device and a network;

inspecting an attribute of the data packet, wherein the attribute includes an application indicator that is associated with an application on the wireless device;

based on the attribute, associating the data packet with at least one of a plurality of service levels;

based on the at least one service level, determining a network policy associated with the wireless device;

enforcing the network policy by causing a message to be sent to the wireless device that causes the wireless device to not request air-interfaces from a sector; and, enforcing the network policy by causing a message to be sent to the wireless device instructing the wireless device to enter a dormant mode if the network policy indicates that the application has a low priority relative to other applications.

18. The method of claim 17, wherein the network policy comprises limiting a throughput rate associated with at least one of a wireless network resource, the wireless device, and the application on the wireless device.

19. The method of claim 17, wherein the network policy comprises limiting an amount of data over a time period associated with at least one of a wireless network resource, the wireless device, and the application on the wireless device.

20. The method of claim 17, wherein the network policy comprises prioritization of at least one of a wireless network resource, the wireless device, and the application on the wireless device.

* * * * *